(12) United States Patent
Sumioka (10) Patent No.: US 8,848,208 B2
(45) Date of Patent: Sep. 30, 2014

(54) PRINTING APPARATUS WITH A READING UNIT, A DRYING UNIT AND A PRESSER

(71) Applicant: Canon Kabushiki Kaisha, Tokyo (JP)

(72) Inventor: Masaki Sumioka, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 14 days.

(21) Appl. No.: 13/683,450

(22) Filed: Nov. 21, 2012

(65) Prior Publication Data

US 2013/0135651 A1    May 30, 2013

(30) Foreign Application Priority Data

Nov. 25, 2011  (JP) ................................ 2011-257428

(51) Int. Cl.

| | | |
|---|---|---|
| *G06K 15/02* | (2006.01) | |
| *B41J 29/393* | (2006.01) | |
| *B41J 11/00* | (2006.01) | |
| *H04N 1/60* | (2006.01) | |
| *B41J 3/44* | (2006.01) | |

(52) U.S. Cl.
CPC ............... *G06K 15/02* (2013.01); *B41J 29/393* (2013.01); *B41J 11/002* (2013.01); *H04N 1/6055* (2013.01); *B41J 3/44* (2013.01)
USPC ........................... 358/1.13; 358/474; 358/498

(58) Field of Classification Search
CPC .................................. H04N 1/00; H04N 1/60
USPC ......................................... 358/1.13, 474–498
See application file for complete search history.

(56) References Cited

U.S. PATENT DOCUMENTS 5,416,613 A * 5/1995 Rolleston et al. ............. 358/518

| | | |
|---|---|---|
| 7,864,783 B2 | 1/2011 | Brewer et al. |
| 8,320,030 B2 | 11/2012 | Kimura |
| 8,508,818 B2 | 8/2013 | Tohnai |
| 2007/0243278 A1 * | 10/2007 | Anelli et al. .................. 425/365 |
| 2009/0034027 A1 | 2/2009 | Yoshimoto et al. |
| 2010/0110435 A1 | 5/2010 | Onishi |
| 2010/0245950 A1 | 9/2010 | Osakabe |
| 2013/0135426 A1 | 5/2013 | Wakayama |

FOREIGN PATENT DOCUMENTS

| | | |
|---|---|---|
| JP | 2008-254221 A | 10/2008 |
| JP | 2008-281549 A | 11/2008 |
| JP | 2010-133915 A | 6/2010 |

OTHER PUBLICATIONS

Machine translation for JP 2008-254221, IDS.*
U.S. Appl. No. 13/683,304, filed Nov. 21, 2012, Masaki Sumioka.
U.S. Appl. No. 13/683,328, filed Nov. 21, 2012, Takeshi Koda.
U.S. Appl. No. 13/683,366, filed Nov. 21, 2012, Masaki Sumioka.
U.S. Appl. No. 13/683,392, filed Nov. 21, 2012, Daigo Kuronuma.
U.S. Appl. No. 13/683,423, filed Nov. 21, 2012, Naoki Wakayama.
Canon Inc., imageRUNNER Advance 6075/6065/6055 Quick Reference, 2010, pp. 45-46, Tokyo JP.

* cited by examiner

*Primary Examiner* — Qian Yang (74) *Attorney, Agent, or Firm* — Canon USA Inc IP Division

(57) ABSTRACT

A sheet on which a pattern is formed in a plurality of rows is conveyed toward downstream at least until an area having the formed pattern reaches an area to be dried by a drying unit. Subsequently, with respect to the pattern, reading by the reading unit for each row included in the plurality of rows and step-feeding of the sheet toward upstream are repeated. A sheet area to be conveyed to a reading area by step-feeding is forcibly dried by the drying unit before reading the sheet area.

15 Claims, 9 Drawing Sheets

PRINTING APPARATUS WITH A READING UNIT, A DRYING UNIT AND A PRESSER

BACKGROUND OF THE INVENTION

1. Field of the Invention

The present invention relates to a printing apparatus for performing colorimetry of a color pattern formed on a sheet and a reading method in a printing apparatus.

2. Description of the Related Art

Japanese Patent Application Laid-Open No. 2008-254221 discuses an ink jet printer including a colorimetric apparatus. This colorimetric apparatus performs colorimetry of a printed color pattern for color calibration and, based on colorimetric data, adjusts colors of color images to be subsequently printed, thus reproducing desired colors. The printer prints color patches as a color pattern for color calibration, and then the colorimetric apparatus performs colorimetry of the color patches with a colorimetric sensor moving in the sheet width direction.

The colorimetric apparatus discussed in Japanese Patent Application Laid-Open No. 2008-254221 includes a printing unit, a reading unit, and a drying unit disposed in this order from upstream to downstream of the sheet conveyance path. The printing unit forms color patches in a sheet area and sends the sheet area to the drying unit. The drying unit dries the sheet area and sends it back to the printing unit. Then, the reading unit reads the color patches.

The colorimetric apparatus discussed in Japanese Patent Application Laid-Open No. 2008-254221 reads the color patches only once. Specifically, the colorimetric apparatus takes into consideration one row of color patches, which can be read in one scan by the colorimetric sensor. Actually, however, forming a greater number of colors in a plurality of rows of color patches enables performing more accurate color calibration. When such color patches formed in a plurality of rows are read, a reading time increases since the number of scans increases. To practically apply the colorimetric apparatus, preventing an increase in total time of inspection, i.e., improving the total throughput, becomes an issue.

When performing sheet colorimetry, the colorimetric apparatus discussed in Japanese Patent Application Laid-Open No. 2008-254221 rotatably shifts a presser plate, which is regularly raised, to press a sheet. Subsequently, a carriage on which the colorimetric sensor is mounted moves to the presser plate and then reads the color patches while moving thereabove. With this configuration, while the carriage exists above the presser plate, it is not possible to rotate the presser plate to retract the carriage. Specifically, to release the pressing by the presser plate to move the sheet, it is necessary to retract the carriage to the outside of the presser plate. The carriage reads the color patches only in the forward path and returns to the home position in the backward path (back feed). Before the carriage completes back feed (backward path) and retracts from above the presser plate to the outside, a following sheet cannot start being moved. This means that the time loss required for back feed disturbs the improvement in reading throughput. In particular, this issue will become distinct when sequentially reading a number of test patterns through repetitive carriage operations.

With the colorimetric apparatus discussed in Japanese Patent Application Laid-Open No. 2008-254221, when the wheel of the carriage runs upon the presser plate, the wheel passes the level difference for the thickness of the presser plate and the impact is transmitted to the carriage. Repetitively applying this impact to the carriage may cause degradation in the attachment accuracy of the colorimetric sensor or a failure of the colorimetric sensor. When the carriage is retracted to the outside of the presser plate, the wheel of the carriage travels on the sheet without the presser plate. Accordingly, when the sheet has a pattern or image printed thereon, the pattern or image may be damaged by the track of the wheel. Each of these factors may cause degradation in reading accuracy.

SUMMARY OF THE INVENTION

An example of the present invention is directed to improving the total throughput of a reading apparatus capable of sequentially reading a test pattern formed in a plurality of rows, and a printing apparatus including the reading apparatus. An example of the present invention is further directed to improving the reading accuracy of a reading apparatus capable of sequentially reading a test pattern formed in a plurality of rows, and a printing apparatus including the reading apparatus.

According to an aspect of the present invention, a printing apparatus includes a printing unit, a reading unit disposed downstream of the printing unit and configured to read a pattern formed by the printing unit, and a drying unit disposed downstream of the reading unit and configured to forcibly dry ink applied to a sheet, wherein the reading unit integrally includes a sensor unit configured to read information on the sheet, a presser configured to press a supporting surface for supporting the sheet, and a reciprocally movable carriage configured to hold the sensor unit, and wherein the sheet on which the pattern is formed in a plurality of rows by the printing unit is conveyed toward downstream so that an area having the formed pattern reaches at least an area to be dried by the drying unit, and subsequently, with respect to the pattern, reading by the reading unit for each row included in the plurality of rows and step-feeding of the sheet toward upstream are repeated.

According to an exemplary embodiment of the present invention, the total throughput and reading accuracy in the read sequence for a test pattern formed in a plurality of rows are improved. Specifically, an exemplary embodiment of the present invention achieves both reduction in the total calibration time and improvement in the reading accuracy of the reading apparatus. As a result, the calibration time, which is an unproductive time for a user of the printing apparatus, can be shortened. The user can use more time for image printing, which is an intended purpose, thus improving the productivity in printing operations.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

An ink jet printing apparatus including a reading apparatus (colorimetric apparatus) according to an exemplary embodiment of the present invention will be described below.

Figure 1:
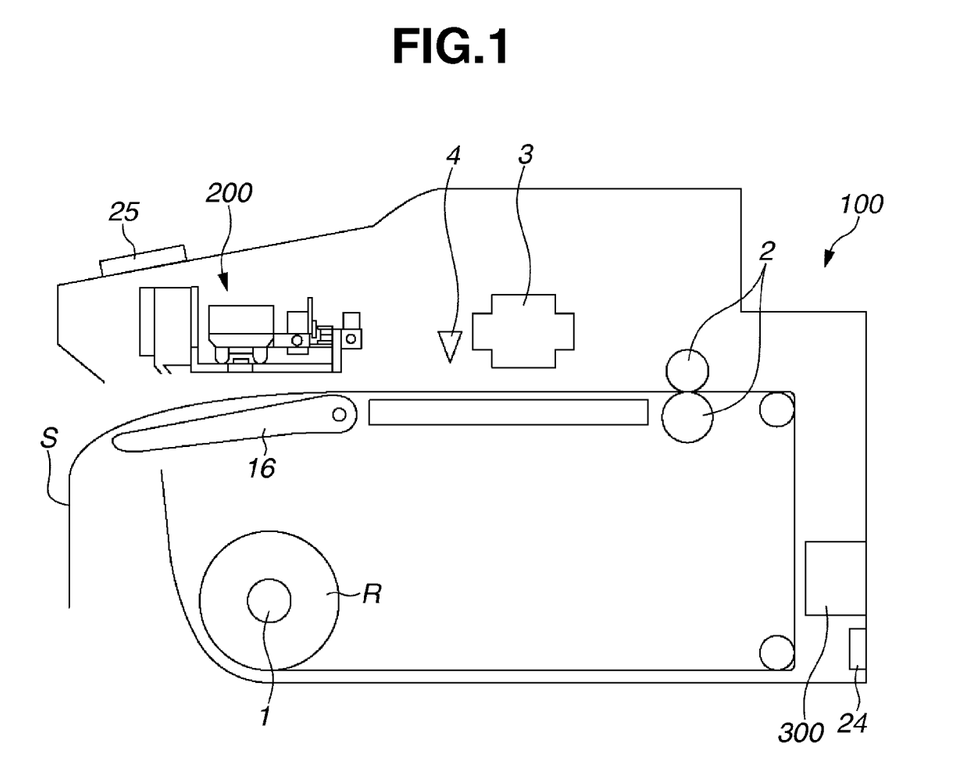
FIG. 1 is a cross sectional view illustrating an overall configuration of a printing apparatus.

FIG. 1 is a cross sectional view illustrating an overall configuration of the printing apparatus. A printing apparatus 100 includes a sheet feed unit 1, a conveyance unit 2, a printing unit 3, a cutting unit 4, a reading unit 200, and a control unit 300.

The sheet feed unit 1 rotatably holds a continuous sheet R wound in roll form. The sheet feed unit 1 pulls out a sheet S from the roll, and a conveyance roller pair of the conveyance unit 2 nips the sheet S and conveys it toward downstream. In the context of the present specification, at any position in the sheet conveyance path, the side toward the sheet feed unit 1 is referred to as "upstream" and the opposite side is referred to as "downstream".

The printing unit 3 includes a plurality of print heads corresponding to a plurality of colors. The printing unit 3 forms an image based either on the serial print process, in which a carriage scans the sheet S conveyed in a first direction to make printing for each band, or on the line print process by using line heads. The present exemplary embodiment will be described below based on the serial print process. The plurality of print heads is ink jet print heads, which discharge ink from nozzles based on the ink jet process. The ink jet process may be based a heater, a piezoelectric element, a micro electromechanical system (MEMS) element, an electrostatic element, and any other devices.

The printing unit 3 can print a test pattern for inspection in addition to a regular desired image on the sheet S. Test pattern refers to a color pattern, such as color patches for color calibration, and a pattern for inspecting any non-discharge state of each nozzle.

The reading unit 200 is disposed downstream of the printing unit 3. The reading unit 200 scans a test pattern formed on the sheet S via a scanner to acquiring color information. The reading unit 200 can be detached from the printing apparatus 100 as one unit.

The cutting unit 4 for cutting the continuous sheet R is disposed between the printing unit 3 and the reading unit 200. The cutting unit 4 cuts an area on the sheet S having the formed test pattern, or cuts a plurality of images printed on the sheet S on an image basis.

A basket-shaped sheet receiving member is disposed at the bottom portion of the printing apparatus 100 which is anterior to the reading unit 200. A sheet discharged after completion of printing or inspection drops into the sheet receiving member by the gravity, and is stacked therein.

The printing apparatus 100 further includes a temperature and humidity sensor 24 for measuring the gas temperature and humidity inside the printing apparatus 100, and an operation unit 25 including input keys for allowing a user to make print setting and a display unit.

The control unit 300 controls the printing apparatus 100 according to the present exemplary embodiment to enable executing not only the regular mode, in which regular image printing is performed, but also the inspection mode, in which a test pattern is printed and inspected for calibration. In the regular mode, the printing unit 3 prints one or a plurality of images on the sheet S, and the cutting unit 4 cuts the plurality of images on the sheet S on an image basis and discharges them. In the inspection mode, the printing unit 3 prints one or a plurality of test patterns on the sheet S, the reading unit 200 reads the test pattern, and the cutting unit 4 cuts the rear end of the test pattern and discharges the sheet S.

Figure 2:
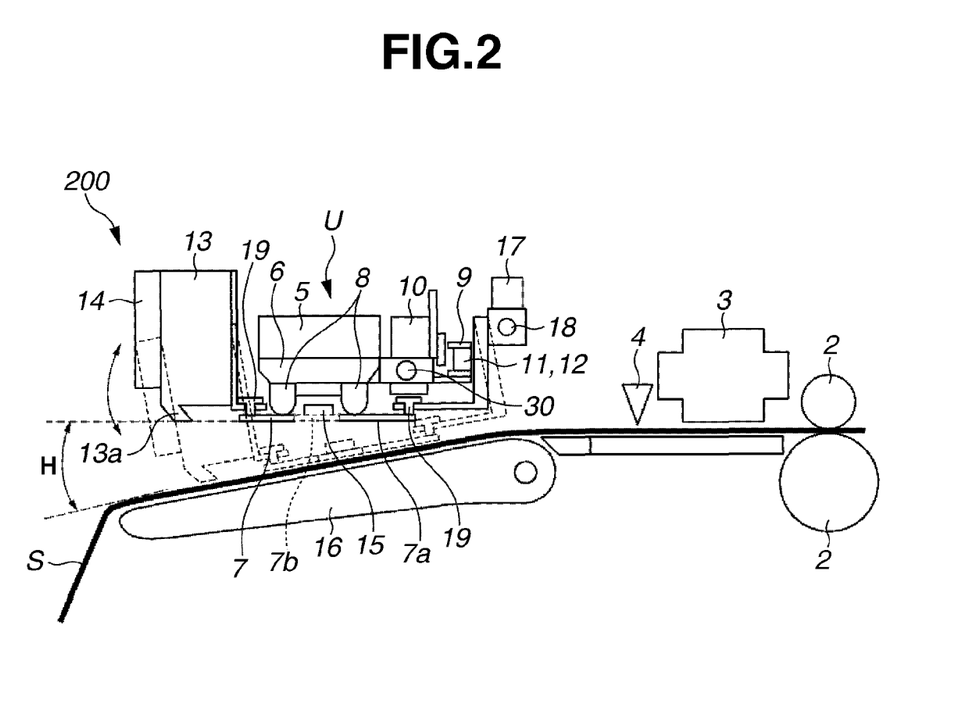
FIG. 2 is a cross sectional view illustrating a detailed configuration of a reading unit.
Figure 3:
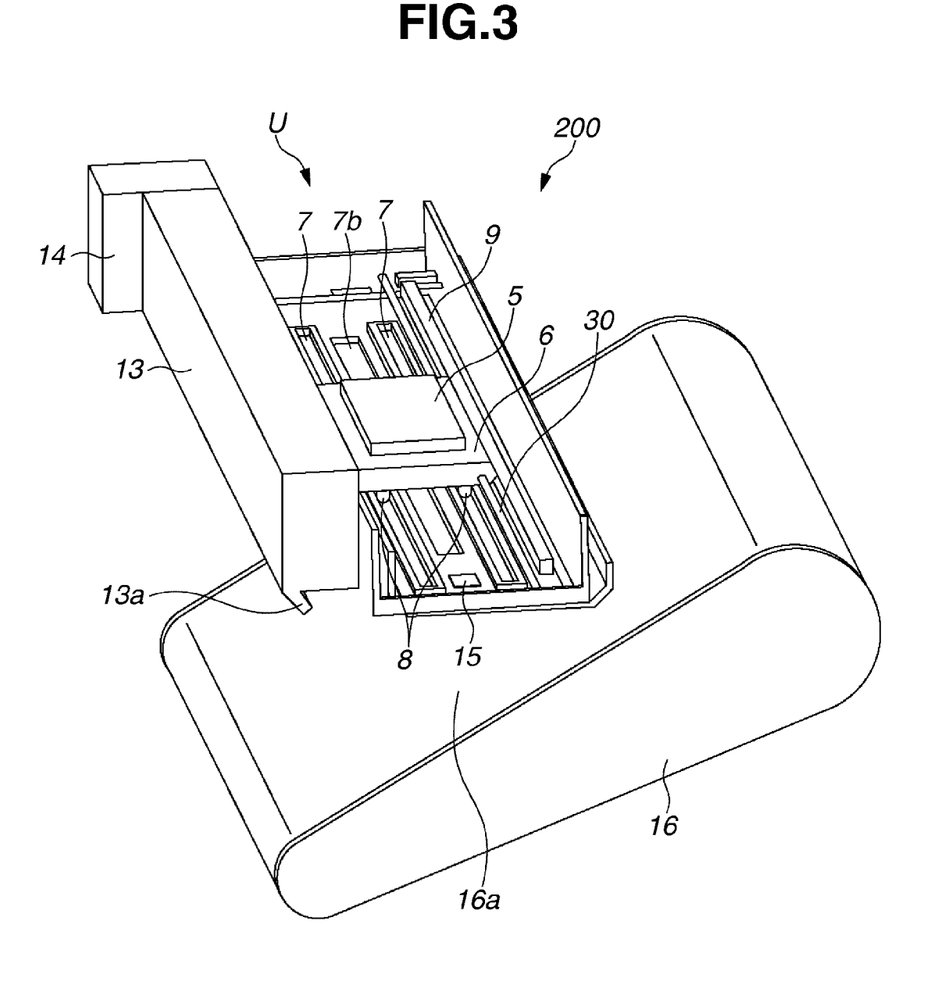
FIG. 3 is a perspective view illustrating an internal configuration of the reading unit.

The configuration and operations of the reading unit 200 according to the present exemplary embodiment will be described in detail below. FIG. 2 is a cross sectional view illustrating an internal configuration of the reading unit 200. FIG. 3 is a partial perspective view illustrating the reading unit 200. In FIG. 3, some members illustrated in FIG. 2 are omitted.

The reading unit 200 includes a scanner unit U and a drying unit in an integrated way. The reading unit 200 can move up and down with respect to a fixed guide 16 fixedly disposed under the reading unit 200. The fixed guide 16 supports the sheet S on a supporting surface 16a (upper surface), which is downwardly inclined toward the downstream side, i.e., a given portion on a more downstream side (discharge side) in the first direction is lower in the gravity direction. The sheet S supported by the supporting surface 16a is subjected to ink drying by the drying unit and scanning by the scanner unit U.

The scanner unit U includes a sensor unit 5 for scanning color information of a test pattern, a carriage 6 supporting the sensor unit 5 and moving along the surface of the sheet S, and a presser plate 7 for pressing the supporting surface 16a of the fixed guide 16 where the sheet S is supported. These members are integrated into one unit. The bottom surface of the presser plate 7 is a flat pressing surface 7a. The pressing surface 7a and the supporting surface 16a sandwich the sheet S to press and fix it during scanning.

The sensor unit 5 includes a light source and a light-sensitive element. The light source irradiates with light the test pattern formed on the sheet S by the printing unit 3, and the light-sensitive element receives light reflected by the test pattern, from different directions. Information about the density and colors of the test pattern is acquired based on the signal strength of the light-sensitive element.

The carriage 6 reciprocally moves along a second direction perpendicularly intersecting with the first direction (sheet conveyance direction). The range of the reciprocal motion of the carriage 6 covers the sheet width, which is, for example, 60 inches. When the carriage 6 moves, a plurality of contact members 8 disposed on the bottom surface of the carriage 6 contact the upper surface of the presser plate 7. The contact members 8 are driven and rotated rotary bodies, such as wheels, or sliding bodies having a small contact portion frictional resistance. A driving belt 9, a motor 10, a driving pulley 11, and an idler pulley 12 form a drive unit for reciprocally moving the carriage 6. The driving belt 9 is stretched between the driving pulley 11 and the idler pulley 12 along the second direction. A part of the driving belts 9 is fixed to the carriage 6. The drive unit converts the rotation of the motor 10 into the rectilinear motion of the carriage 6. A guide shaft 30 and the presser plate 7 form a guide unit for guiding the motion of the carriage 6 in the second direction. When the carriage 6 reciprocally moves, the contact members 8 contact the upper surface of the presser plate 7, and the inner surface of a guide hole of the carriage 6 contacts the cylindrical surface of the guide shaft 30, thus maintaining the posture of the sensor unit 5. The presser plate 7 is attached to the chassis of the scanner unit U via a coupling member 19, with a predetermined adjustment stroke (play). This enables changing the posture of the surface of the presser plate 7 with respect to the scanner unit U within a range of the adjustment stroke of the coupling member 19.

A slit 7b (an opening oblong along the second direction) is formed in the middle of the presser plate 7. The slit 7b is an opening for allowing passage of light to scan the test pattern. The carriage 6 moves along the longitudinal direction of the slit 7b. The sensor unit 5 irradiates the surface of the sheet S with light through the opening of the slit 7b to detect reflected light. Specifically, a reading position (reading area) of the test pattern exists directly under the slit 7b.

As described above, the presser plate 7 is provided with first and second portions having an oblong shape extending within a predetermined range in a direction parallel to the moving direction of the carriage 6. The first and second portions are disposed so as to sandwich the reading position of the sensor unit 5. The first and second portions may be different portions of one presser plate or portions of two divided plates. The bottom portion of the sensor unit 5 is provided with a first contact member, which contacts the surface of the above-described first portion, and a second contact member, which contacts the surface of the above-described second portion, when the carriage 6 moves.

A color calibration plate 15 is disposed on the outside of one end of the slit 7b. The color calibration plate 15 functions as a reading criterion when performing calibration for temporal change in the reading characteristics of the sensor unit 5 accompanying temperature change and aging. When performing calibration, the carriage 6 moves to a position where the sensor unit 5 faces the color calibration plate 15. The sensor unit 5 detects colors to acquire information about colors and brightness of the color calibration plate 15 based on the detector output.

A movement mechanism 17 enables the reading unit 200 to rotate centering on a rotation shaft 18 disposed upstream of the sensor unit 5. The movement mechanism 17 is provided with a drive unit including a motor and a worm gear. When the drive unit rotates, a wedge-shaped space opening and closing on the downstream side is formed between the pressing surface 7a of the presser plate 7 and the supporting surface 16a of the fixed guide 16. An interval H on the most downstream side of the opening is variable within a range from zero to a predetermined maximum value.

At the time of a read operation, the reading unit 200 is set to a pressing position (referred to as a first position in which the interval H is zero) in which the presser plate 7 presses the supporting surface 16a. On the other hand, at the time of a sheet feed operation or drying operation, the movement mechanism 17 retracts the reading unit 200 to a retracted position (the interval H is larger than zero) in which the pressing by the presser plate 7 is released. The number of retracted positions is not limited to one, and a plurality of retracted positions may be provided: a second position (the interval H is a minimum value H3 larger than zero) suitable for step-feeding the sheet S, a third position (the interval H is an intermediate value H4 between the maximum and minimum values) suitable for drying the sheet S, and a fourth position (the interval H is a maximum value H2) suitable for introducing the leading edge of the sheet S. Specifically, the presser plate 7 is controlled to be set to four different positions (postures). When reading the test pattern, since the presser plate 7 is pressed onto the supporting surface 16a, the slit 7b is completely shut by the fixed guide 16, preventing external light and ink mist from entering the scanner unit U through the slit 7b. Thus, high-accuracy reading is enabled.

To maintain a high reading accuracy with the sensor unit 5, it is desirable to maintain the relative distance and relative angle between the sensor unit 5 and the surface of the sheet S facing it within a predetermined range. Actually, however, the sheet S may absorb moisture in ink or air, thus resulting in waving (cockling). When the sheet S is roll paper, it may have a tendency to be curled. Since the surface of the sheet S is not necessarily flat in this way, at the time of reading, the presser plate 7 presses the sheet S against the supporting surface 16a of the fixed guide 16 to flatten the sheet S. Since the slit 7b formed on the presser plate 7 is an opening, a portion of the sheet S facing the opening cannot be pressed. However, since the width of the slit 7b (in the first direction) is very narrow, pressing the sheet S by both edges of the slit 7b enables sufficiently correcting floating portions of the sheet S in the reading area.

The presser plate 7 is an easily-deformable flexible member made of such a material as an acrylonitrile-butadiene-styrene (ABS) resin or a polycarbonate (PC) resin having a thickness of about 1 to 3 mm to prevent damage to the surface of the sheet S (particularly, a portion on which a test pattern P is formed). On the other hand, the fixed guide 16 is made of a rigid body. The supporting surface 16a of the fixed guide 16 has higher stiffness than the presser plate 7. When the presser plate 7 presses the sheet S, both the sheet S and the presser plate 7 are made into a shape along the surface shape (flat surface) of the fixed guide 16.

If the sheet S is strongly curled or cockled, a part of the flexible presser plate 7 may be lifted by a floated portion of the sheet S, possibly resulting in imperfect adhesion of the sheet S. Even in this case, in the vicinity of portions where the contact members 8 ride on the upper surface of the presser plate 7, the contact members 8 intensively press the presser plate 7 by the total weight of the sensor unit 5 and the carriage 6. Accordingly, portions of the sheet S floating from the supporting surface 16a are resolved in the vicinity of the reading position. Thus, high reading accuracy is maintained.

Figure 8:
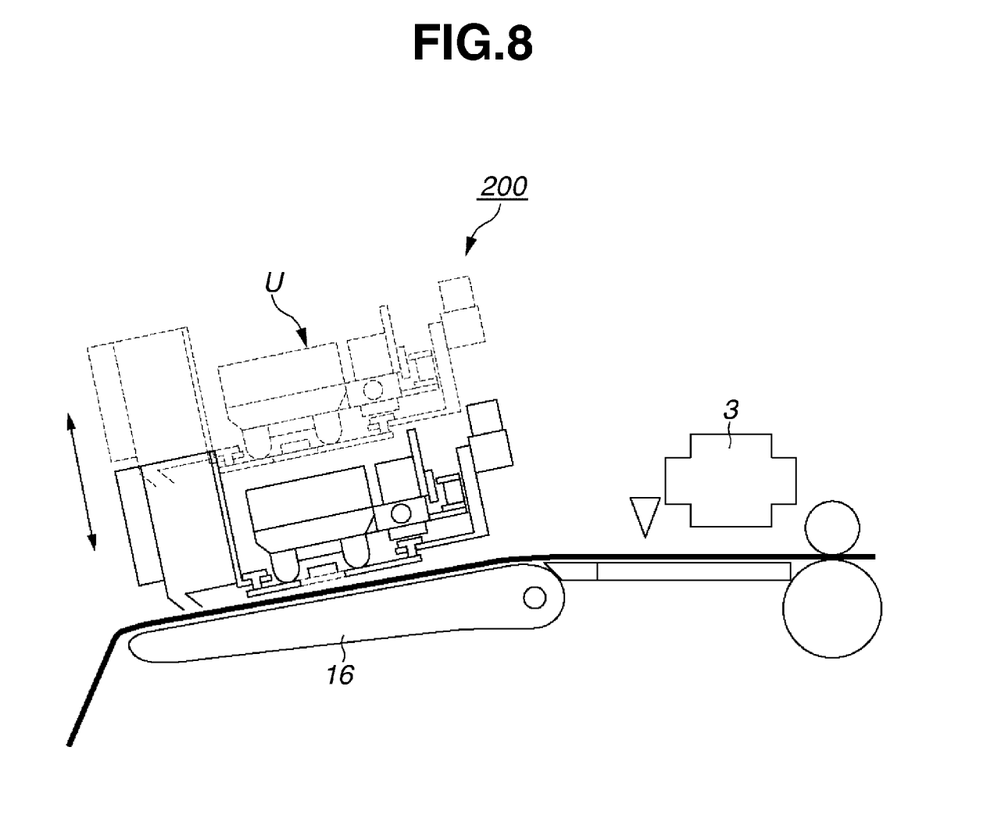
FIG. 8 illustrates a modification in which the reading unit moves up and down in parallel movement.

Although, in the present exemplary embodiment, the interval between the presser plate 7 and the supporting surface 16a is changed by rotating the reading unit 200 around the rotation shaft 18 to change the posture of the reading unit 200, the present exemplary embodiment is not limited thereto. The reading unit 200 may be moved up and down while maintaining the posture of the reading unit 200 constant. Specifically, while constantly maintaining the presser plate 7 in parallel with the supporting surface 16a of the fixed guide 16, the presser plate 7 is moved in the vertical or oblique direction for pressing and retracting. FIG. 8 illustrates an example of modification in which the entire reading unit 200 is moved up and down in an oblique direction, indicated by the arrows, between the first position (solid lines) for the pressing and the second position (broken lines) for releasing the pressing.

The drying unit promotes the dryness of ink applied to the sheet S before reading by the reading unit 200. The drying unit includes a blower unit 14 including a heater and a drying fan, and a duct 13 for sending warm air generated by the blower unit 14 to the surface of the sheet S. The drying unit may not necessarily include both the heater and the drying fan, and may not include either one as long as the drying unit exhibits a required drying capability. The duct 13, as a basic structure constituting the reading unit 200, also serves as a reinforcing member for improving the stiffness of the entire reading unit 200, together with the guide shaft 30. An end of the duct 13 is an air outlet 13a. The air outlet 13a, having a width equal to or larger than the width of the sheet S to be dried, blows off warm air to simultaneously dry the entire area of the sheet S directly under the air outlet 13a.

Figure 4:
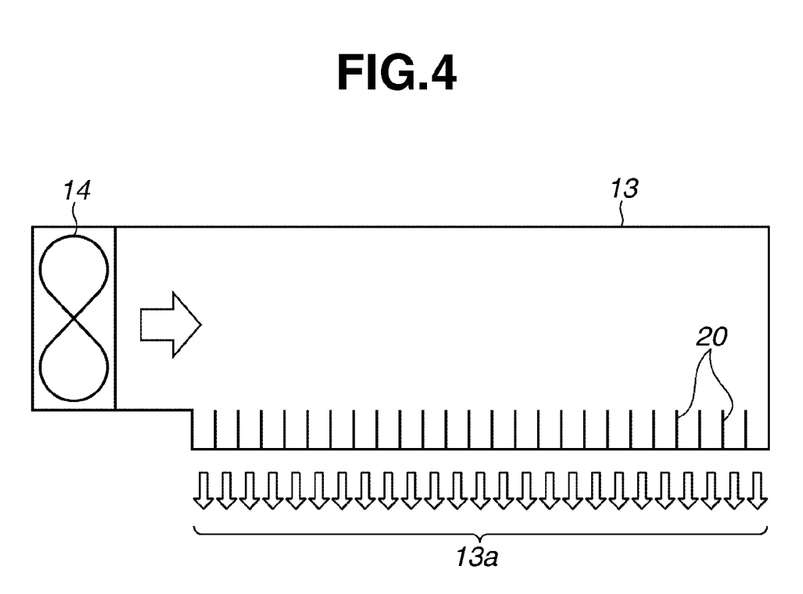
FIG. 4 is a cross sectional view illustrating an internal configuration of a drying unit.

FIG. 4 is a cross sectional view illustrating an internal configuration of the drying unit. Referring to FIG. 4, the horizontal direction refers to the sheet width direction (second direction). The air outlet 13a is a long hole for blowing off air over a range covering the width of the sheet S used. The long hole is provided with a plurality of fins 20 at regular intervals to provide as uniform air volumes in the second direction as possible and stabilize the wind direction. Warm air generated by the blower unit 14 is straightened by the fins 20 so that air currents are blown off in almost one direction and uniform air volumes are provided (as illustrated by a number of arrows in FIG. 4). Air currents are uniformly blown off on the surface of the sheet S supported on the fixed guide 16 over a range covering the width of the sheet S.

Air currents blown off from the air outlet 13a flow into a closed space in the vertical direction between the presser plate 7 and the supporting surface 16a of the fixed guide 16, from downstream to upstream. Supplying warm air into the closed space in the vertical direction between the fixed guide 16 and the presser plate 7 prevents wind speed reduction achieving efficient air blasting. In particular, the wedge-shaped space provides a narrower interval on the more upstream side, thus effectively preventing wind speed reduction.

Further, since a portion on the supporting surface 16a of the fixed guide 16 before a portion where the sheet S hangs down from the fixed guide 16 serves as a drying area, the flow of warm air from downstream to upstream effectively dries the sheet S. In the present specification, an area where warm air flows from downstream to upstream along the surface of the sheet S and a desired drying effect is acquired is referred to as an "effective drying area." The length of the effective drying area in the sheet conveyance direction is an integral multiple of (N times) the amount of feed of step-feeding (described below).

The flow of warm air from downstream to upstream of the scanner unit U prevents ink mist (generated in the printing unit 3 on the upstream side) from flowing into the scanner unit U. Thus, the light source and light-sensitive element of the sensor unit 5 are prevented from being stained by ink mist. In an embodiment of the present invention, the drying unit may be configured to operate while the printer unit 3 is generating ink mist.

Figure 5:
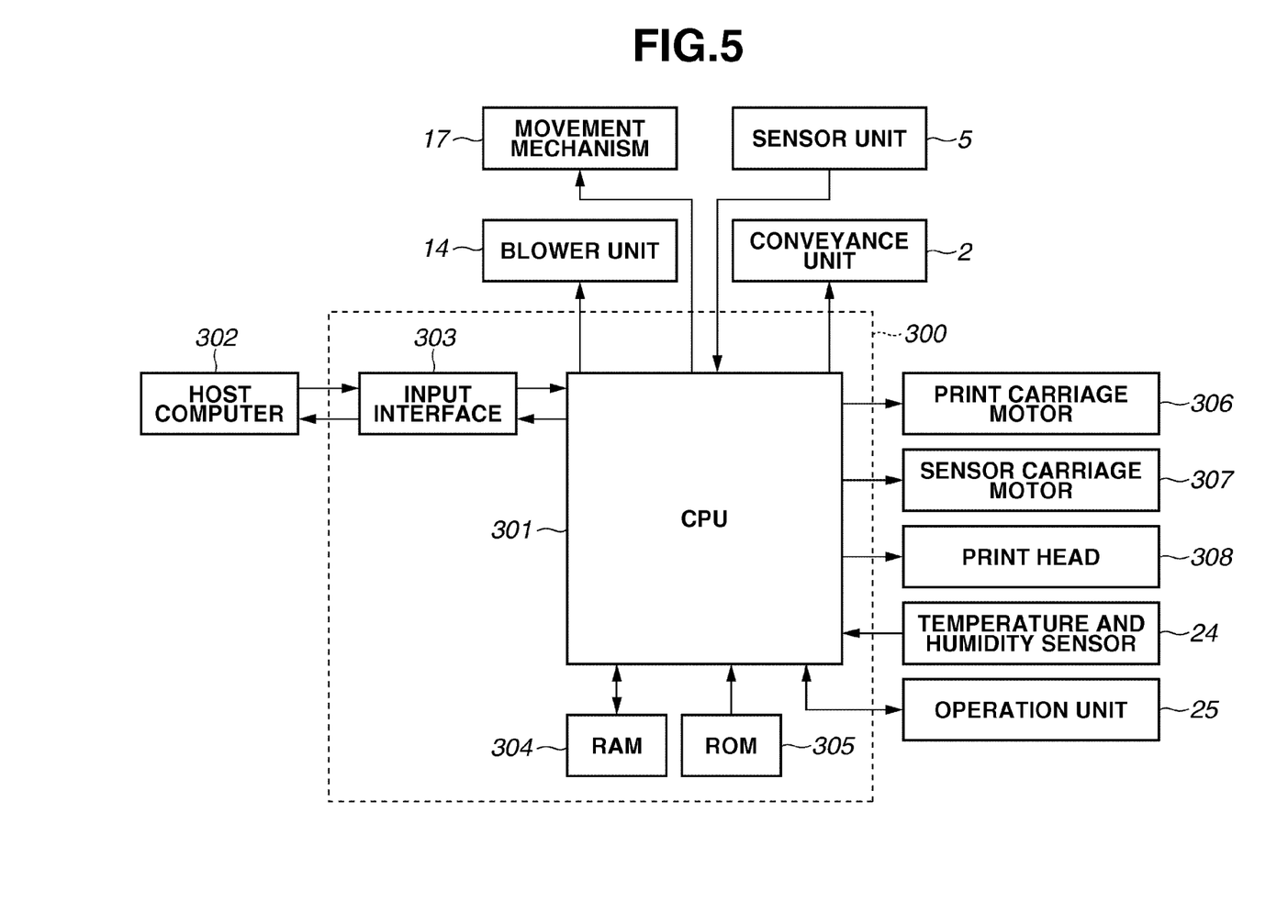
FIG. 5 is illustrates a system configuration centering on a control unit.

FIG. 5 illustrates a system configuration of the printing apparatus 100 according to the present exemplary embodiment centering on the control unit 300. The control unit 300 is a computer system including a central processing unit (CPU) 301, an input/output interface 303, a random access memory (RAM) 304, and a read-only memory (ROM) 305. These elements may be configured as an application specific integrated circuit (ASIC). The CPU 301 totally controls print operations, drying operations, read operations, and calibration operations according to a control program stored in the ROM 305. The RAM 304 is used as a work area by the CPU 301 to perform these operations. The CPU 301 inputs from the host computer 302 print data and various setting information via the input/output interface 303. The CPU 301 inputs and outputs data from/to the operation unit 25. The CPU 301 further individually controls the conveyance unit 2 (drive motor), the drive of the heater and fan of the blower unit 14, the movement mechanism 17 (drive motor), the print carriage motor 306, the sensor carriage motor 307, and the print head 308. The CPU 301 further inputs a signal acquired by the sensor unit 5 and a signal acquired by the temperature and humidity sensor 24, and performs calibration based on the input signals.

Operations performed by the printing apparatus 100 having the above-described configuration to read a test pattern and perform calibration (color calibration) will be described below. FIGS. 6A, 6B, 6C, 6D, 6E, and 6F illustrate operating states of the printing apparatus 100. FIG. 7 is a flowchart illustrating an operating sequence controlled by the control unit 300.

Roll paper and cut paper can be used for the printing apparatus 100 according to the present exemplary embodiment. In step S1, the CPU 301 sets the reading unit 200 to the fourth position (maximum interval), which is the retracted position in which the pressing is released, thus enabling sheet conveyance. Then, the CPU 301 takes a sheet S from a roll R in the sheet feed unit 1, and conveys the sheet S to a position under the printing unit 3 via the conveyance unit 2.

In step S2, the CPU 301 prints an image P (a test pattern) on the sheet S. When the leading end of the image forming area of the sheet S is conveyed to the position under the printing unit 3, the CPU 301 discharges ink from the print head, while reciprocally moving the carriage 6 of the printing unit 3, to print images for one band on the sheet S. The CPU 301 forms the image P (a test pattern for calibration) including a plurality of rows as a test pattern on the sheet S based on the serial print process, in which step-feeding of the sheet S for one band and image printing for one band are alternately repeated. Specifically, while moving the sheet S in the forward direction, the printing unit 3 sequentially prints patch rows included in the test pattern on a row basis.

Thus, the sheet S on which the test pattern is formed is introduced into the reading unit 200, and moves toward downstream, being guided on the supporting surface 16a of the fixed guide 16. When the leading edge of the sheet S passes the fixed guide 16, the sheet S advances toward a portion where the sheet S bends downward and then falls by the gravity (as illustrated in FIG. 6A).

Figure 6A:
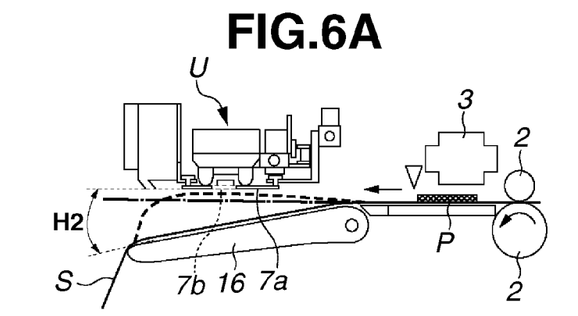
FIGS. 6A, 6B, 6C, 6D, 6E, and 6F illustrate operating states of the printing apparatus.
Figure 7:
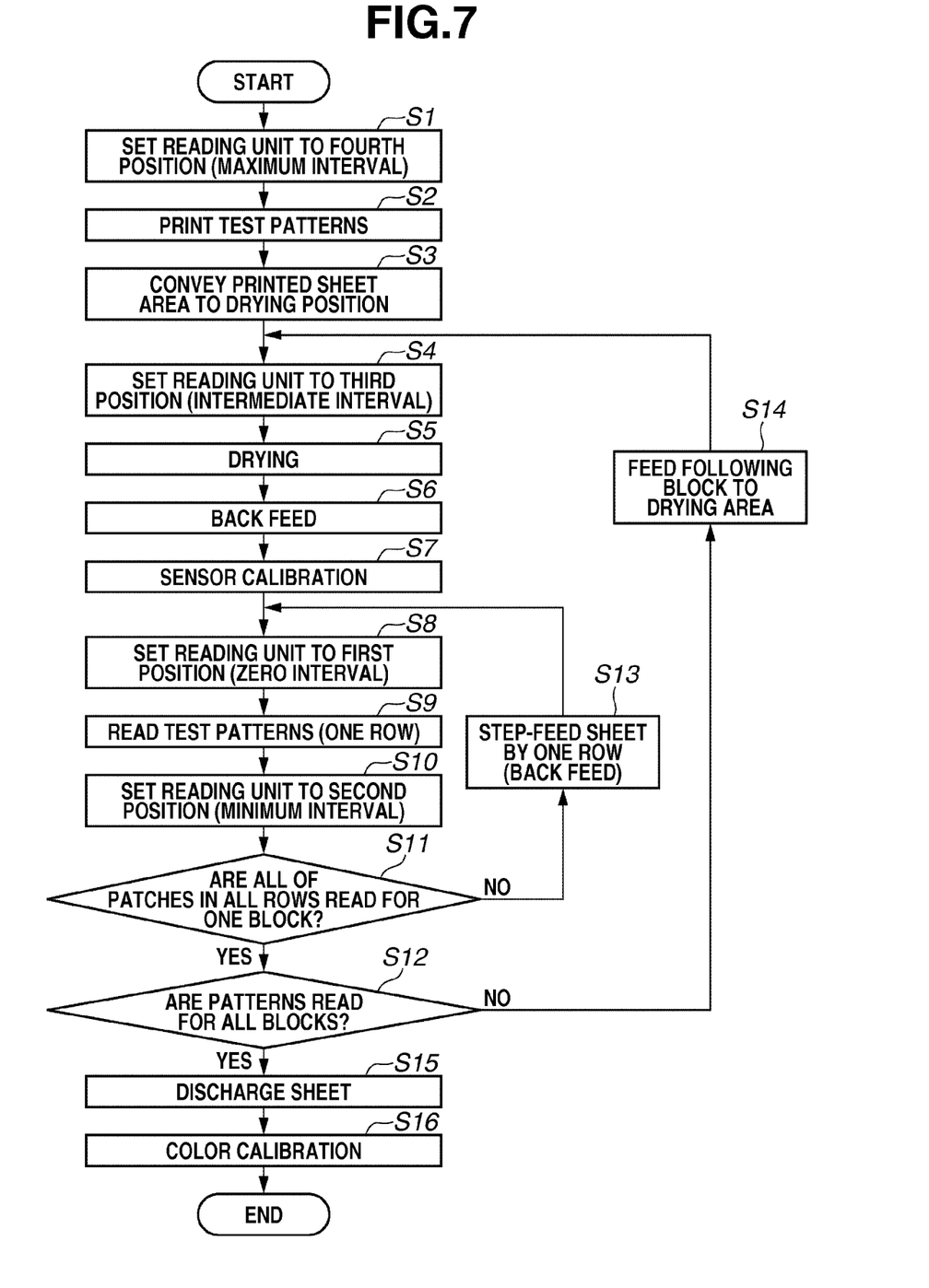
FIG. 7 is a flowchart illustrating an operating sequence of the printing apparatus.

There is a case where the leading edge of the sheet S conveyed is strongly curled (as illustrated by a broken line in FIG. 6A). There is another case where the sheet S having high stiffness separates from the supporting surface 16a without being guided according to the fixed guide 16, and then advances almost horizontally (as illustrated by a chain line in FIG. 6A). In particular, immediately after ink application where ink has not yet been dried, the sheet S has a tendency to be strongly curled depending on the amount of ink applied. Although the sheet S is curled downward in the example illustrated by the broken line in FIG. 6A, there is also a case where the sheet S is curled upward. If the sheet S is downwardly curled or if the sheet S horizontally advances, the curled portion of the sheet S may strongly scrape against the pressing surface 7a of the presser plate 7. In this case, the ink of the test pattern which has not yet been sufficiently dried adheres to and stains the pressing surface 7a, or the test pattern may be damaged. If the sheet S is upwardly curled or if the sheet S horizontally advances, the leading edge of the sheet S introduced into the reading unit 200 may enter the slit 7b, causing conveyance jam.

To solve these issues, in the present exemplary embodiment, the reading unit 200 is set to the fourth position to extend the interval between the supporting surface 16a of the fixed guide 16 and the pressing surface 7a of the presser plate 7 to the maximum interval H2. Thus, even in the case of the sheet S as illustrated by the broken line or chain line in FIG. 6A, the above-described issues of abrasion and conveyance jam hardly occur. Of course, the sheet S in the regular condition as illustrated in the solid line does not cause the above-described issues.

In step S3, the CPU 301 conveys the sheet area in which the image P is printed to the effective drying area of the drying unit. Upon completion of the image P print process, the CPU 301 proceeds to the drying process before the image reading process to promote the dryness of ink applied to the sheet S. The CPU 301 performs such a forced drying process to shorten the time until colors of the image P formed on the sheet S are stabilized.

Figure 6B:
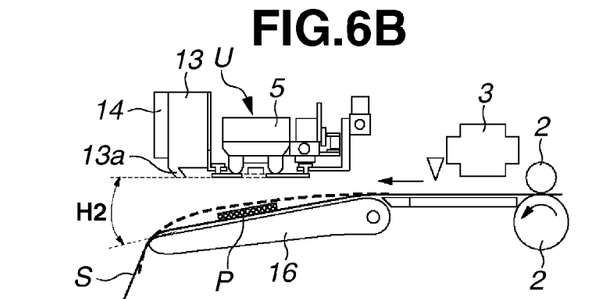
Figure 6C:
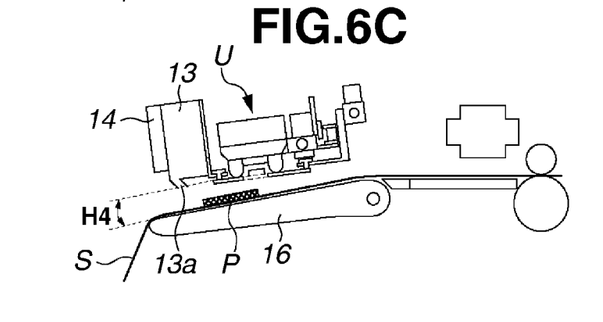

As described above, the reading unit 200 includes the scanner unit U and the drying unit arranged on the downstream side of the scanner unit U. The CPU 301 conveys the sheet S until the rear end area (the last patch row) of the image P formed on the sheet S skips the scanner unit U and reaches the effective drying area of the drying unit (as illustrated in FIG. 6B). As described above, the effective drying area is an area where warm air is applied to the sheet S in the drying process to acquire a desired drying effect. The length of the effective drying area in the sheet conveyance direction is an integral multiple of (N times) the amount of feed of step-feeding (described below). This enables collectively drying a plurality of rows of patches at one time.

In step S4, the CPU 301 changes the reading unit 200 from the fourth position (maximum interval H2) to the third position (intermediate interval H4). At the third position, the interval H4 is suitable for the drying operation to be performed next. The air outlet 13a is oriented in such a direction that warm air is blown off toward the upstream side of the conveyance path. Specifically, the drying area includes an area directly under the scanner unit U on the upstream side of the drying unit. Thus, in comparison with a case where the drying area is provided on the downstream side, the amount of escaping warm air is reduced, thus enabling efficiently drying a wide range at one time (as illustrated in FIG. 6A).

In step S5, the CPU 301 forcibly dries the area in which a test pattern is formed. The CPU 301 turns ON the drying fan and the heater included in the blower unit 14. Warm air generated by the blower unit 14 passes through the duct 13 and then is blown off from the air outlet 13a onto the sheet S. The image P in a one-block area (for example, an area for three rows of patches) positioned in the effective drying area is forcibly dried. When the time required for drying has elapsed, the CPU 301 turns OFF the drying fan to reduce the output of the fan. The CPU keeps the heater ON. The OFF state refers not only to a state where the rotation of the fan is completely stopped but also to a state where the rotational speed of the fan has decreased to such an extent that vibration is sufficiently reduced.

In step S6, to read the image P, the CPU 301 back-feeds the sheet S in reverse direction. The CPU 301 conveys the sheet S in the reverse direction until the rear end area (a patch row last formed) on the image P reaches the reading position directly under the slit 7b of the scanner unit U. If the reading position is included in the effective drying area and the rear end area is positioned at the reading position, this back feed is not required.

In steps S1 to S6, the reading unit 200 is in the retracted state, where the presser plate 7 is separated from the supporting surface 16a of the fixed guide 16, with different intervals therebetween, and, therefore, the sheet S can freely move within the interval.

In step S7, before reading for colorimetry, the CPU 301 performs sensor calibration for the reading characteristics of the sensor unit 5. Values read by the sensor unit 5 may change depending on the environment and aging, causing changes in colorimetric values. Therefore, prior to actual reading in step S9, the CPU 301 calibrates the sensor unit 5.

Specifically, the CPU 301 moves the carriage 6 to an end of the side on which the color calibration plate 15 is disposed, and detects the optical characteristics (colors) of the color calibration plate 15 via the sensor unit 5. Then, the CPU 301 performs sensor calibration based on the result of the measurement. In sensor calibration, the CPU 301 corrects data of the detection result so that the measurement result at the time of colorimetry of the color calibration plate 15 serves as intended reference values. Alternatively, the luminous intensity of the light source and the gain of the light-sensitive element included in the sensor unit 5 may be adjusted so that the intended output values are acquired.

When performing sensor calibration in step S7, the output of the drying fan has decreased in the drying unit. Therefore, the fan does not vibrate when reading the color calibration plate 15, thus enabling reading the color calibration plate 15 with high accuracy. Performing sensor calibration in step S7 during back feed in step S6 enables improving the total throughput. The reading unit 200 may be moved to the first position before step S7.

Figure 6D:
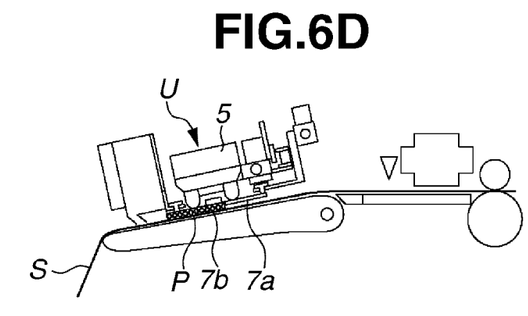

In step S8, the CPU 301 changes the reading unit 200 from the third position (intermediate interval H4) to the first position (zero interval). The sheet S subjected to pattern reading is pressed between the presser plate 7 and the supporting surface 16a of the fixed guide 16 to be securely fixed at the reading position (as illustrated in FIG. 6D).

In step S8, the reading unit 200 rotates centering on the rotation shaft 18 on the upstream side to be lowered. The pressing surface 7a of the presser plate 7 contacts the sheet S on the upstream side first, so that the contact surface gradually widens toward downstream. Therefore, the sheet S is fixed between the pressing surface 7a and the supporting surface 16a of the fixed guide 16, without slack and crease on the sheet S. In addition, since the posture of the pressing surface 7a minutely changes according to the supporting surface 16a within a range of the adjustment stroke of the coupling member 19, the pressing surface 7a and the supporting surface 16a closely contact each other across the sheet S.

In step S9, the CPU 301 reads a part (one row) of the test pattern on the sheet S via the scanner unit U. Moving together with the movement of the carriage 6 in the second direction, the sensor unit 5 reads one row in the test pattern on the surface of the sheet S to acquire color information.

Figure 6E:
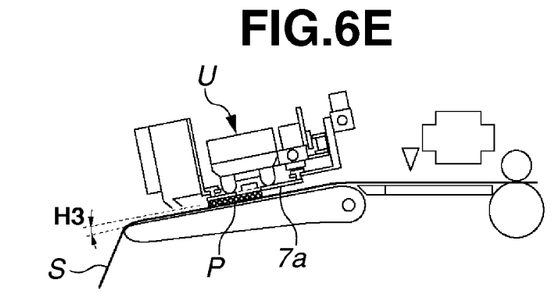

In step S10, the CPU 301 changes the reading unit 200 from the first position (zero interval) to the second position (minimum interval H3). The reading unit 200 changes from the pressing state to the retracted state, and the pressing onto the sheet S by the presser plate 7 is released (as illustrated in FIG. 6E). At the second position, the interval H3 is the minimum interval with which to allow sheet conveyance.

Figure 6F:
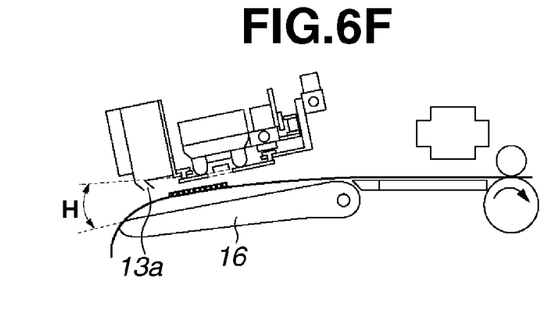

At the second position (see FIG. 6E) set in step S10, since the rotation for changing the reading unit 200 from the first position to the second position requires only a short time, a greater number of rows of patches to be repetitively read improves the throughput to a more extent. If the sheet S used is known to have a tendency to be strongly curled, then in step S10, the reading unit 200 may be set to the third position, in which the interval is larger than that at the second position, as illustrated in FIG. 6F. Types of sheets to be used (input by the user from the operation unit 25) and information about the temperature and humidity inside the printing apparatus 100 measured by the temperature and humidity sensor 24 can be used as parameters reflecting the tendency to be curled. The recording duty, printing mode (curling in the high-definition mode in which more ink is applied is larger than curling in the normal mode), and patch arrangement can also be used as parameters. The control unit 300 sets an interval in the retracted state according to these parameters.

In step S11, the CPU 301 determines whether the reading unit 200 has read all of the plurality of rows of patches included in the test pattern of one block dried at once in step S5. When the CPU 301 determines that the reading unit 200 has read all of the plurality of rows of patches (YES in step S11), the processing proceeds to step S12. Otherwise, when the CPU 301 determines that the reading unit 200 has not yet read all of the plurality of rows of patches (NO in step S11), the processing proceeds to step S13.

In step S13, the CPU 301 step-feeds the sheet S by one row in the reverse direction (back feed) so that patches next to the patches in the row last read comes to the reading position. Then, the processing returns to step S8 to repeat the similar sequence. Thus, the CPU 301 reads the test pattern formed in a plurality of rows by repeating the one-row read sequence via the sensor unit and the step-feed (back feed) sequence. In the one-row read sequence, the presser plate 7 and the supporting surface 16*a* of the fixed guide 16 are pressed on each other. In the step-feed sequence, the pressing is released.

Thus, since the entire reading unit 200 including the presser plate 7 retracts from the sheet S to enable sheet conveyance, the sheet conveyance operation can be started regardless of the position of the carriage 6. After reading the test pattern (step S9) in the forward path of the reciprocally movable carriage 6, performing the operation for returning the carriage 6 to the home position during processing in step S10 (subsequent movement of the reading unit 200) to step S13 (step-feed) will remarkably improve the total throughput. As another method, it is also possible to read the test pattern in each of the forward path and backward path of the reciprocally movable carriage 6. More specifically, the CPU 301 may read one row in the test pattern in the forward path and performs step-feeding, and then reads the next one row in the test pattern in the backward path.

In step S12, the CPU 301 determines whether the reading unit 200 has read all of patterns for a plurality of blocks constituting the entire test pattern. When the CPU 301 determines that the reading unit 200 has read all of patterns for the plurality of blocks (YES in step S12), the processing proceeds to step S15. Otherwise, when the CPU 301 determines that the reading unit 200 has not yet read all of patterns for the plurality of blocks (NO in step S12), the processing proceeds to step S14.

In step S14, the CPU 301 feeds the sheet S until patterns of the following block reach the effective drying area. Then, the processing returns to step S4 to repeat similar sequence from the step of drying the test pattern for the following block. In the second and subsequent drying sequences, since air dry corresponding to the time period spent in the previous process is added, it is desirable to reduce the drying time or drying capability in consideration of the air dry.

In step S15, the CPU 301 cuts via the cutting unit 4 the sheet S from which all of the blocks have been read, and feeds the sheet S in the forward direction to discharge it to the outside of the printing apparatus 100.

In step S16, the CPU performs color-related calibration processing. The CPU 301 acquires information about colors of the test pattern based on the data obtained in pattern reading in step S8. Then, the control unit 300 performs color calibration for adjusting the amount of ink applied by the print heads for respective colors so that desired colors are reproduced in the final print product.

Meanwhile, the following sheet area to be conveyed to the reading position by step-feeding in step S13 is promoted to be dried by the drying unit before undergoing the read sequence. Although the drying unit reduces the output of the drying fan to reduce vibration, it has drying capability to a certain extent since the heater is operating. Specifically, even during the read and step-feed sequences for one row included in the test pattern, a sheet area including another row to be subsequently read is also forcibly dried.

Vibration of the drying fan may affect the throughput at the time of read sequence. Therefore, reducing the output of the drying fan only during the scanning sequence of the scanner unit U and increasing the output thereof in the step-feed sequence enable improving the total throughput. To further improve the throughput, the drying process may be performed with the maximum capacity even during the scanning sequence of the scanner unit U. In this case, it is desirable that the drying unit uses a low-vibration drying fan or directly irradiates the sheet surface by using an infrared heater generating no vibration.

To achieve suitable drying conditions for the following patch rows during the step-feed and read sequences, it is desirable to perform timer-based management so that the time interval between step-feeding and the following step-feeding may be a predetermined time period T suitable for drying the sheet S. A method for determining the predetermined time T and the processing sequence of a read operation will be described below.

Suppose that one step-feed sequence feeds the sheet S by a distance M, the effective drying area has a length L in the conveyance direction, and one patch is forcibly dried for a total time period K. As described above, L is an integral multiple of M, i.e., $L/M=N$ (N is an integer equal to or larger than 1). By using these parameters, the predetermined time period T is determined as $T=K/N$. The CPU 301 repetitively performs the read processing by using the predetermined time period T determined in this way.

In step S13 (FIG. 7), before the step-feed (back feed) sequence, the CPU 301 waits until a time period counted by a timer reaches the predetermined time period T. Specifically, when the CPU 301 starts the processing in step S8, the CPU 301 starts counting a timer included in the control unit 300. Then, when the processing proceeds to step S13 via the processing in steps S9 to S11, the CPU 301 waits until the time period counted by the time reaches the predetermined time period T (wait processing). When the time period counted by the time reaches the predetermined time period T, the CPU 301 starts the step-feed sequence. As a result of such processing, the total drying time K is reached for each patch included in the test pattern, resulting in a read sequence under suitable drying conditions. Suitably setting the drying capability of the drying unit during the step-feed and read sequences enables performing a required drying sequence in one cycle of the read and step-feed sequences. In this case, the above-described weight processing is not required.

Thus, if suitable drying conditions for the following patch row are obtained during the step-feed and read sequences by introducing timer-based management, the prior drying processing (step S5), the determination processing (step S12), and the feed processing (step S14) in FIG. 7 can be omitted.

Figure 9:
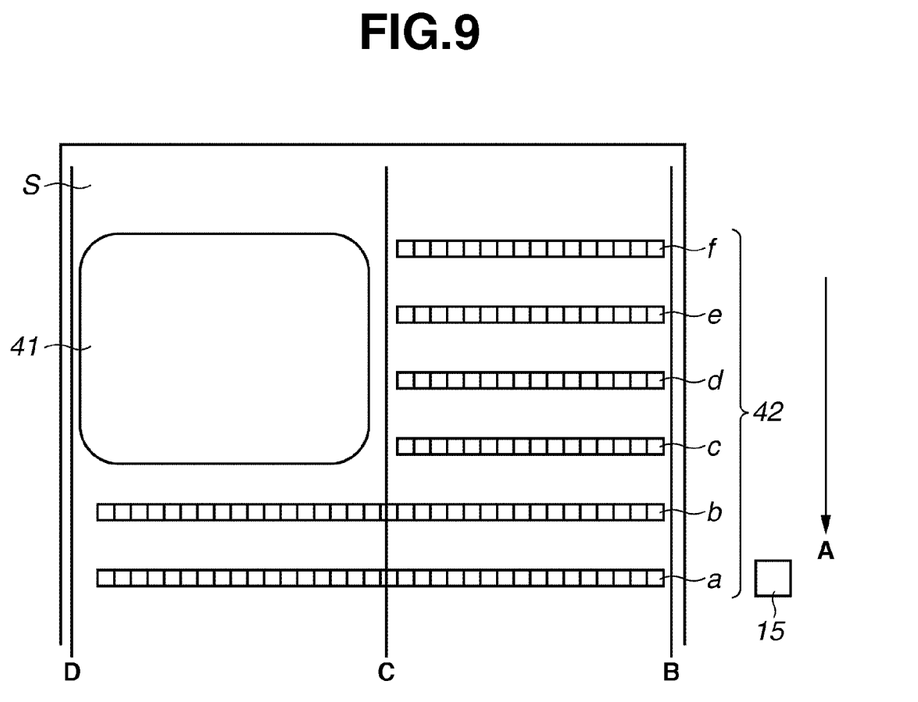
FIG. 9 illustrates an example of a test pattern formed on a sheet.

FIG. 9 illustrates an example of a test pattern formed on the sheet S. The test pattern is formed of a number of color patches 42 and a sample image 41 for comparison before and after color calibration. The layout of the color patches 42 and the sample image 41 can be freely set by the user.

In this example, the color patches 42 are formed in six rows (rows a to f) in a conveyance direction A (back feed direction) of the sheet S. The row f is a patch row on the most downstream side (the leading edge side of a sheet). The printing unit 3 forms the test pattern in order of the rows f to a. The rows a and b are formed almost over the entire sheet width, i.e., a range from position B to position D. Subsequent rows c, d, e, and f are printed over about a half of the sheet width, i.e., a range from position B to position C. The sample image 41 is formed over the remaining sheet width, i.e., a range from position C to position D.

The reading unit 200 reads the color patches 42 formed in this layout in order of the rows a to f one by one, by repeating step-feeding (back feed). The home position of the carriage 6 exists on the position B side.

The sheet S on which the test pattern is formed by the printing unit 3 is back-fed until the first row reaches the reading position directly under the slit 7b. At this timing, the reading unit 200 is set to the second position (the pressing released). Subsequently, the CPU 301 sets the reading unit 200 to the first position (pressing position) to press the sheet S between the presser plate 7 and the supporting surface 16a. The CPU 301 reads the patches in the row a one by one from position B to position D via the sensor unit 5 while moving the carriage 6 from position B to position D for scanning. Subsequently, the CPU 301 sets the reading unit 200 to the second position, and then step-feeds the sheet S in the back feed direction by the distance of one patch row. Then, the CPU 301 sets the reading unit 200 to the first position again, and then reads the patches in the row b one by one from position D to position B via the sensor unit 5 while moving the carriage 6 from position D to position B for scanning. When the read sequence for the row b is completed, the CPU 301 sets the reading unit 200 to the second position, and then step-feeds the sheet S in the back feed direction.

The scanning direction of the read sequence alternately changes for each row in this way. As described above, the scanning direction of the read sequence for each patch row may be constantly the same direction (from position B to position D). In this case, the CPU 301 performs the operation for returning the carriage 6 to the home position (on the position B side) while step-feeding the sheet S.

When subsequently reading the patches in the rows c and d, the CPU 301 sets the scanning range to the distance corresponding to the length of each patch row in the sheet width direction. The CPU 301 sets the reading unit 200 to the first position, and then reads the patches in the row c one by one from position B to position C via the sensor unit 5 while moving the carriage 6 from position B to position C for scanning. Subsequently, the CPU 301 sets the reading unit 200 to the second position, and then step-feeds the sheet S in the back feed direction. Then, the CPU 301 sets the reading unit 200 to the first position, and then reads the patches in the row d one by one from position C to position B via the sensor unit 5 while moving the carriage 6 from position C to position B for scanning. When the read sequence for the row d is completed, the CPU 301 sets the reading unit 200 to the second position, and then step-feeds the sheet S in the back feed direction.

Thus, the CPU 301 can shift to the following row without scanning the area of the sample image 41 not subjected to colorimetry, thus improving the reading throughput. Further, since the carriage 6 does not move on the sample image 41, the contact members 8 do not strongly press the sample image 41 via the flexible presser plate 7, thus reducing any damage of the sample image 41.

When subsequently reading the patches in the rows e and f, similar to the above-described sequences, the CPU 301 sets the scanning range to the distance corresponding to the length of each patch row in the sheet width direction. However, in this example, after the read sequence for the row e, the CPU 301 performs sensor calibration processing for maintaining constant the reading characteristics of the sensor, which may change with the temperature. In the sensor calibration processing, the CPU 301 reads the color information for the surface of the color calibration plate 15 via the sensor unit 5, and then adjusts the sensor or corrects the sensor output so that correct results of reading are obtained.

The CPU 301 sets the reading unit 200 to the first position, and then reads the patches in the row e one by one from position B to position C via the sensor unit 5 while moving the carriage 6 from position B to position C for scanning. In this case, the CPU 301 performs the sensor calibration processing before the read sequence for the row f. Since the color calibration plate 15 is disposed on the position B side, it is necessary to move the sensor unit 5 to the color calibration plate 15. The CPU 301 sets the reading unit 200 to the second position, and then moves the carriage 6 from position C to position B, and further up to the color calibration plate 15 outside while step-feeding the sheet S in the back feed direction. Then, the CPU 301 sets the scanner unit 50 to the first position, and then reads the surface of the color calibration plate 15 via the sensor unit 5 to acquire color information. The control unit 300 performs the sensor calibration processing based on the acquired color information. Upon completion of the sensor calibration processing, similar to the above-described sequences, the CPU 301 reads the patches one by one in the last row f from position B to position C, returns the carriage 6 to the home position, and terminates the series of processing.

Upon completion of the read sequences for all of patch rows, the control unit 3 performs color calibration for adjusting the amount of ink applied by the print heads for respective colors so that desired colors are reproduced in the final print product.

According to the above exemplary embodiment, the total throughput and reading accuracy in the read sequences for a plurality of rows in a test pattern are improved. Specifically, the present exemplary embodiment achieves both a reduction in the total calibration time and an improvement in the reading accuracy of the printing apparatus 100. As a result, the calibration time, which is an unproductive time for a user of the printing apparatus 100, can be shortened. The user can use more time for image printing, which is an intended purpose, thus improving the productivity in printing operations.

Particularly in the present exemplary embodiment, in repetitive read and step-feed (back feed) sequences, during the read and step-feed sequences for one row, a sheet area including another row to be subsequently read is dried by the drying unit. In processing for reading the test pattern by repeating three sequences (dry, read, and step-feed sequences), the read and step-feed processing and the drying processing are performed in parallel, i.e., overlapped in time sequence, thus remarkably improving the total throughput.

Further, in the present exemplary embodiment, there is no conveyance roller on the downstream side of the printing unit 3, and the test pattern is read by repeating the step-feed (back feed) sequence. The test pattern printed by the printing unit 3 is not nipped by the conveyance roller at least until the read sequence by the scanner unit U is completed. Therefore, regardless of the length of the formed test pattern in the conveyance direction, the test pattern is not damaged or the conveyance roller is not stained by ink before reading, thus ensuring high-accuracy read operations for a prolonged period of time.

Further, in the present exemplary embodiment, the reading unit 200 includes the presser plate 7 for pressing the supporting surface 16a supporting the sheet S, and the reciprocally movable carriage 6 for holding the sensor unit 5 on the presser plate 7, the pressure plate 7 and the carriage 6 being integrated into one unit. Thus, since the entire reading unit 200 including the presser plate 7 retracts from the sheet S to enable sheet conveyance, the sheet conveyance operation can be started regardless of the position of the carriage 6. This remarkably contributes to an improvement in the total throughput in processing for reading the test pattern by repeating the read and step-feed sequences. In addition, since the carriage 6 is constantly on the presser plate 7 without level differences, no impact occurs while the carriage 6 is moving. Therefore, a sensor failure due to the degraded attachment accuracy of the sensor unit 5 is not likely to occur, thus maintaining high reading accuracy for a prolonged period of time.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-257428 filed Nov. 25, 2011, which is hereby incorporated by reference herein in its entirety.

What is claimed is:

1. A printing apparatus comprising:
a printing unit;
a reading unit disposed downstream of the printing unit and configured to read-a patterns formed by the printing unit; and
a drying unit disposed downstream of the reading unit and configured to forcibly dry ink applied to a sheet,
wherein the reading unit integrally includes a sensor unit configured to read information on the sheet, a presser configured to press a supporting surface for supporting the sheet, and a reciprocally movable carriage configured to hold the sensor unit,
wherein a sheet on which the patterns are formed in a plurality of rows by the printing unit is conveyed toward downstream so that an area having the formed patterns reaches at least an area to be dried by the drying unit, and subsequently, with respect to the patterns, reading by the reading unit for each row included in the plurality of rows and step-feeding of the sheet toward upstream are repeated, and
wherein the presser and the supporting surface are being pressed during the reading, and the pressing is being released during the step-feeding.

2. The printing apparatus according to claim 1, wherein an operation for returning the carriage to a home position is performed during the step-feeding.

3. The printing apparatus according to claim 2, wherein an interval between the presser and the supporting surface during the step-feeding is smaller than the interval when a leading edge of the sheet on which the patterns are formed by the printing unit is introduced onto the supporting surface.

4. The printing apparatus according to claim 2, wherein the interval between the presser and the supporting surface during the step-feeding is smaller than the interval during drying by the drying unit.

5. The printing apparatus according to claim 1, wherein the drying unit includes an air outlet for blowing off air, and the air from the air outlet flows from downstream to upstream in a space between the presser and the supporting surface.

6. The printing apparatus according to claim 5, wherein the air outlet includes a long hole for blowing off air over a range covering a width of the sheet used, and the long hole is provided with a plurality of fins.

7. The reading apparatus according to claim 1, wherein the presser is made of a flexible plate member having a lower stiffness than the supporting surface has.

8. The printing apparatus according to claim 1, wherein the reading unit further includes, integrally, the drying unit.

9. The printing apparatus according to claim 1, wherein, during the reading, an output of a fan included in the drying unit is controlled to be reduced.

10. The printing apparatus according to claim 1, wherein a conveyance roller for conveying the sheet is disposed upstream of the printing unit, and no conveyance roller is disposed downstream of the printing unit.

11. A printing apparatus comprising:
a printing unit;
a reading unit disposed downstream of the printing unit and configured to read patterns formed by the printing unit; and
a drying unit disposed downstream of the reading unit and configured to forcibly dry ink applied to a sheet,
wherein the reading unit integrally includes a sensor unit configured to read information on the sheet, a presser configured to press a supporting surface for supporting the sheet, and a reciprocally movable carriage configured to hold the sensor unit,
wherein a sheet on which the patterns are formed in a plurality of rows by the printing unit is conveyed toward downstream so that an area having the formed patterns reaches at least an area to be dried by the drying unit, and subsequently, with respect to the patterns, reading by the reading unit for each row included in the plurality of rows and step-feeding of the sheet toward upstream are repeated, and
wherein an operation for returning the carriage to a home position is performed during the step-feeding.

12. A printing apparatus comprising:
a printing unit;
a reading unit disposed downstream of the printing unit and configured to read patterns formed by the printing unit; and
a drying unit disposed downstream of the reading unit and configured to forcibly dry ink applied to a sheet,
wherein the reading unit integrally includes a sensor unit configured to read information on the sheet, a presser configured to press a supporting surface for supporting the sheet, and a reciprocally movable carriage configured to hold the sensor unit,
wherein a sheet on which the patterns are formed in a plurality of rows by the printing unit is conveyed toward downstream so that an area having the formed patterns reaches at least an area to be dried by the drying unit, and subsequently, with respect to the patterns, reading by the reading unit for each row included in the plurality of rows and step-feeding of the sheet toward upstream are repeated, and
wherein the reading is enabled in each of forward and backward paths of the reciprocally movable carriage, the step-feeding is performed after one row in the patterns is read in the forward path, and the following row in the pattern is read in the backward path.

13. A printing apparatus comprising:
a printing unit;
a reading unit disposed downstream of the printing unit and configured to read patterns formed by the printing unit; and
a drying unit disposed downstream of the reading unit and configured to forcibly dry ink applied to a sheet, wherein the reading unit integrally includes a sensor unit configured to read information on the sheet, a presser configured to press a supporting surface for supporting the sheet, and a reciprocally movable carriage configured to hold the sensor unit, wherein a sheet on which the patterns are formed in a plurality of rows by the printing unit is conveyed toward downstream so that an area having the formed patterns reaches at least an area to be dried by the drying unit, and subsequently, with respect to the patterns, reading by the reading unit for each row included in the plurality of rows and step-feeding of the sheet toward upstream are repeated, and wherein the reading unit is configured to rotate centering on a rotation shaft disposed upstream, and, in a state where the reading unit retracts from the supporting surface, a space having such a shape that an interval between the presser and the supporting surface decreases toward upstream is formed.

14. The A printing apparatus comprising:

a printing unit;

a reading unit disposed downstream of the printing unit and configured to read patterns formed by the printing unit; and a drying unit disposed downstream of the reading unit and configured to forcibly dry ink applied to a sheet, wherein the reading unit integrally includes a sensor unit configured to read information on the sheet, a presser configured to press a supporting surface for supporting the sheet, and a reciprocally movable carriage configured to hold the sensor unit, wherein a sheet on which the patterns are formed in a plurality of rows by the printing unit is conveyed toward downstream so that an area having the formed patterns reaches at least an area to be dried by the drying unit, and subsequently, with respect to the patterns, reading by the reading unit for each row included in the plurality of rows and step-feeding of the sheet toward upstream are repeated, and wherein, when the step-feeding is repeated, a time interval between step-feeding and the following step-feeding is controlled under timer-based management so that the time interval is suitable for drying.

15. A printing apparatus comprising:

a printing unit;

a reading unit disposed downstream of the printing unit and configured to read patterns formed by the printing unit; and a drying unit disposed downstream of the reading unit and configured to forcibly dry ink applied to a sheet, wherein the reading unit integrally includes a sensor unit configured to read information on the sheet, a presser configured to press a supporting surface for supporting the sheet, and a reciprocally movable carriage configured to hold the sensor unit, wherein a sheet on which the patterns are formed in a plurality of rows by the printing unit is conveyed toward downstream so that an area having the formed patterns reaches at least an area to be dried by the drying unit, and subsequently, with respect to the patterns, reading by the reading unit for each row included in the plurality of rows and step-feeding of the sheet toward upstream are repeated, and wherein, a length of an effective drying area of the drying unit in a conveyance direction is an integral multiple of the amount of feed of the step-feeding.

* * * * *